INVENTOR
Horst W. A. Gerlach
BY Harry M. Saragovitz,
Edward J. Kelly, Herbert Berl
& J. D. Edgerton
ATTORNEYS April 16, 1968 H. W. A. GERLACH 3,378,789

SOLID STATE OSCILLATOR HAVING PLURAL RESONATING CAVITIES AND TUNNEL DIODES

Filed Nov. 16, 1966 2 Sheets-Sheet 2

INVENTOR

Horst W. A. Gerlach

BY Harry M. Saragovitz, Edward J. Kelly, Herbert Berl & J. D. Edgerton

ATTORNEYS

United States Patent Office 3,378,789 Patented Apr. 16, 1968

3,378,789

SOLID STATE OSCILLATOR HAVING PLURAL RESONATING CAVITIES AND TUNNEL DIODES

Horst W. A. Gerlach, Bethesda, Md., assignor to the United States of America as represented by the Secretary of the Army Filed Nov. 16, 1966, Ser. No. 595,318
8 Claims. (Cl. 331—107)

ABSTRACT OF THE DISCLOSURE

A solid state oscillator employing a magnetron structure with a plurality of resonating cavities and having a plurality of tunnel diodes associated respectively with the cavities or resonator portions of said structure. The tunnel diodes are appropriately located so as to act as current generators operating to add energy to the resonators in such a manner that a standing wave pattern is achieved in the interaction space of the magnetron where the device acts as an oscillator.

The invention described herein may be manufactured and used by or for the Government of the United States of America for governmental purposes without the payment to me of any royalty thereon.

The present invention relates to a solid state oscillator employing a magnetron type of resonant structure, and is more particularly concerned with an oscillator of the type described utilizing tunnel diodes as the exciting RF-current sources.

It is well-known that in conventional magnetrons, under oscillating conditions, a rotating space charge is effected which has a spoke configuration, and that the rotating space charge spokes formed by the RF wave field stay in interaction with the rotating electromagnetic wave which propagates along the structure. The rotating space charge spokes are built up by virtue of the resonator gap fields, if the space charge and the E.M. wave are constrained to stay in synchronism. For efficient operation, the RF gap field must be of considerable strength; and this in turn requires high gap RF potentials which in turn requires high resonator impedance. An important point for proper operation is the impedance match between the "beam impedance" and the gap RF impedance which essentially rely on the conditions before-mentioned.

A magnetron structure of the conventional type described above normally employs a centrally disposed cathode associated with an anode block disposed about the cathode and spaced therefrom by an interaction space. The anode block normally includes a plurality of cavities which open via anode slots into the interaction space; and a magnetic field is applied to the overall structure in a direction at right angles to the electric DC field of the structure to effect appropriate control of the electron motion between the cathode and anode block. Since conventional magnetrons rely upon free electron motion, they can only operate in a high vacuum.

The present invention, while employing resonator configurations similar to those suggested heretofore for use in magnetrons, further utilizes tunnel diodes appropriately located adjacent selected portions of the resonator structure and acting as current generators adding energy to the resonator. Since this use of tunnel diodes eliminates the need for free electron motion which has characterized magnetrons heretofore, the oscillator of the present invention can be made completely solid state in configuration. As a result, the vacuum envelope, and the magnetic and electric DC fields which have characterized conventional magnetrons heretofore, no longer need be utilized. The "field matching" conditions needed to effect a rotating space charge in the interaction space of the structure are achieved by locating the tunnel diodes, acting as low negative impedance current generators, in the RF current maximum of the resonators employed.

The device of the present invention is a relatively low-power device, and is capable of generating RF power in the order of several tens of milliwatts, up to the one watt level, depending on the tunnel diodes employed. The solid state oscillator of the present invention operates, of course, at the very low voltages which are inherent to the tunnel diodes employed. The total efficiency of the structure, however, exceeds by far that of a reflex klystron of comparable power level and frequency.

It is accordingly an object of the present invention to provide a novel solid state oscillator which is simple, compact, rugged, and relatively light in weight.

Another object of the present invention resides in the provision of a solid state oscillator employing a magnetron type of resonator structure, but which eliminates the need for a high vacuum envelope, or for the magnetic or electric fields, which have characterized magnetrons heretofore.

A further object of the present invention resides in the provision of a solid state oscillator which can be formed in either three-dimensional configurations, or in a type of two-dimensional or printed circuit configuration.

Still another object of the present invention resides in the provision of a novel solid state oscillator utilizing tunnel diodes as current sources.

In providing for the foregoing objects and advantages, the present invention contemplates the provision of a solid state oscillator which comprises a resonator structure taking any of the forms previously associated with conventional magnetrons. In this respect, as will appear hereinafter, the resonator structure may be of the "hole-and-slot" type, or of the "slot" type, or of the "vane" type, or of the "rising sun" type, or of the interdigital type combined with an external resonator. Still other structures, and variants of the structures described, will be apparent to those skilled in the art; and all of these various structures are comprehended by the term "magnetron resonant structure" utilized hereinafter and in the appended claims. The magnetron resonant structure utilized in the present invention has a plurality of tunnel diodes associated respectively with the cavities or resonator portions of said structure. These tunnel diodes are appropriately located so as to act as current generators operating to add energy to the resonators in such manner that a standing wave pattern is achieved in the interaction space of the device, whereby the device acts as an oscillator. The structure lends itself readily to tuning. Moreover, as will appear, various coupling arrangements can be employed to guide RF power from the oscillator to an external load.

The foregoing features will become more readily apparent from the following description and accompanying drawings in which.

Figure 1:
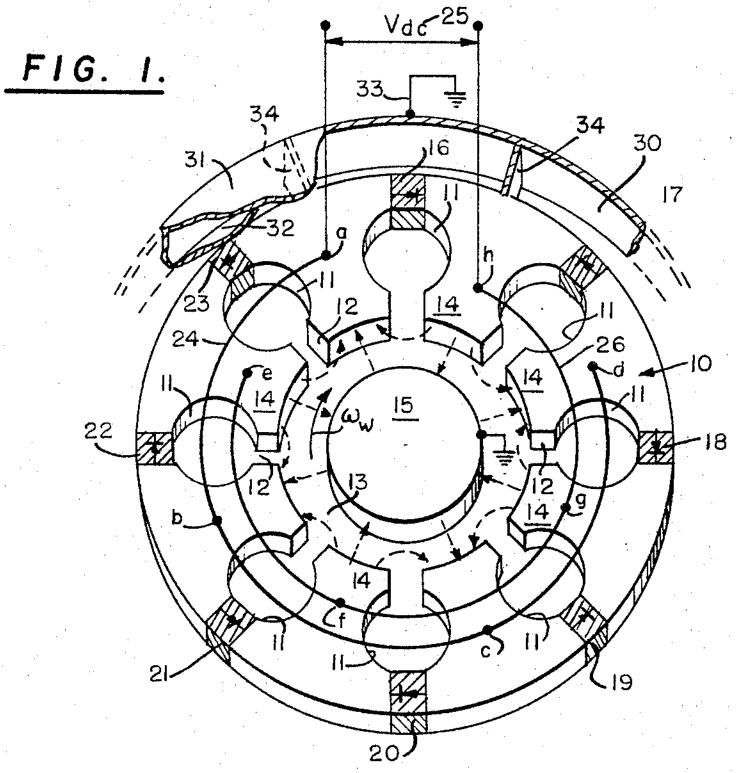
FIGURE 1 is a diagrammatic representation of a solid state oscillator constructed in accordance with the present invention.

Referring initially to FIGURE 1, it will be seen that a solid state oscillator constructed in accordance with the present invention comprises a magnetron resonant structure 10 which, in the form illustrated in FIGURE 1, is similar to the "hole-and-slot" type of configuration well-known in itself in conventional magnetrons. The resonator 10 (as well as any other form of magnetron resonant structure employed in practicing the present invention) can be constructed in "three dimensions," employing a solid cavity resonator block as used in conventional magnetrons; or it can take a form of "two-dimensional" configuration wherein "strip line" techniques are utilized. In the particular embodiment shown in FIGURE 1, the magnetron resonant structure 10 is illustrated as a block, and, more particularly, as a block of the hole and slot type.

The structure 10 comprises a plurality of anode cavities 11 connected via slots 12 to an interaction space 13. Arcuate poles 14 are defined between the several slots 12. Interaction space 13 is defined between the arcuate extremities of poles 14 and the outer substantially circular surfaces of a grounded element 15, located centrally within the structure 10 in spaced relation to the several poles 14.

The various cavities 11 are excited by means of tunnel diodes 16–23, inclusive, poled as illustrated in FIGURE 1. The diodes 16–23 are located respectively in the outer peripheral portion of the magnetron resonant structure 10, substantially in alignment with slots 12, and positioned in gaps located between each of the cavities 11 and the outermost periphery of said structure 10. By reason of this positioning of the tunnel diodes 16–23, said diodes are situated respectively in the RF current maximums of the various resonators provided by structure 10. As will appear, the tunnel diodes act as low negative impedance current generators functioning to contribute power to the resonator to sustain oscillations in the overall device.

The circumferential phase condition (periodicity of the structure) and proper coupling of the several cavities 11 to one another, is achieved by strapping. This same strapping arrangement serves to properly energize the several tunned diodes. More particularly, a strap ring 24, preferably located in the end space of resonator 10, is coupled at one of its ends to one side of a DC voltage source 25. Strap ring 24 is connected to alternate ones of the anode poles 14 at the points designated *a–d* inclusive. A second strap ring 26, preferably also located in the end space of resonator 10, is connected at one end to the other side of source 25, and is further connected to the intervening ones of said poles 14 at the points designated *e–h*, inclusive, located respectively between points *a–d*. This strapping arrangement thus provides the necessary DC power to the various tunnel diodes 16–23 from the single source 25 and, in addition to effecting proper coupling of the cavities 11 to one another, establishes strong phase-locking of each single tunnel diode excited cavity to simultaneously support the total power output of the oscillations.

In operation, an electric field is established in the interaction space 13, across the several gaps 12, and between the poles 14 and grounded structure 15, in the manner illustrated in dotted lines in FIGURE 1. A standing wave pattern is achieved in the interaction space; and this standing wave pattern can be resolved into two opposite rotating wave fields having an angular RF frequency:

$$\omega_{RS}=\frac{N}{2}\omega_W$$

where $N$=the number of resonators, and
$\omega_W$=the angular wave velocity.

In a conventional magnetron, which is a beam type of device, the rotating electrons must be synchronized with $\omega_W$. However, in the device of the present invention, this condition is not required. The resonance or oscillation frequency is determined solely by the resonance of a single cavity. The single cavity resonance is excited by the current pulse of its associated tunnel diode.

Figures 2, 3A:
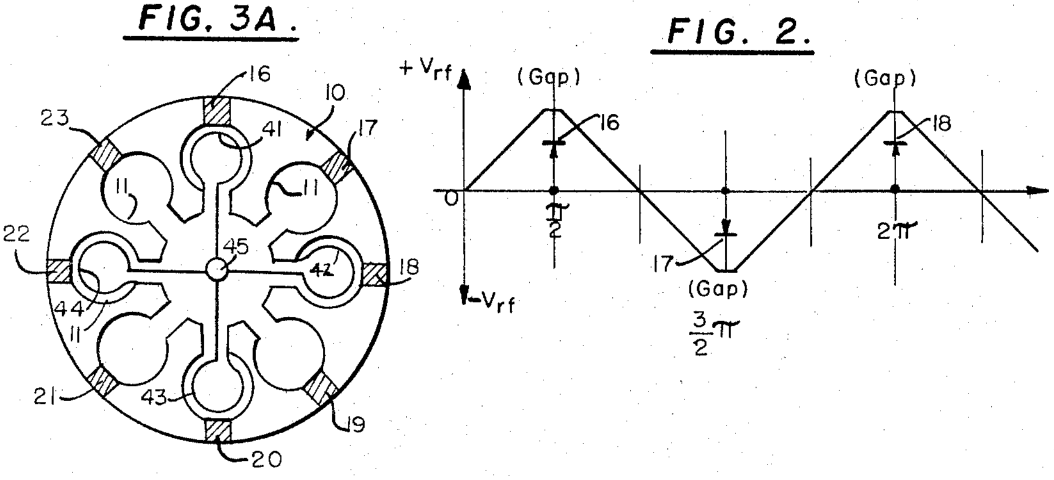
FIGURE 2 is a graphical representation illustrating the operation of the tunnel diodes utilized in the present invention.
FIGURES 3A and 3B are top and side diagrammatic views respectively of one form of coupling arrangement, for coupling power to an external load, which can be employed in the present invention.

FIGURE 2 illustrates, in part, the manner in which excitation of the resonant structure is effected for the "$\pi$-Mode" operation of the device. More particularly, referring to FIGURES 1 and 2 together, the tunnel diodes 16, 18, 20 and 22, contribute power to the generation of oscillation during the "+ phase," and the tunnel diodes 17, 19, 21, and 23, contribute power to the generation of oscillations during the "— phase." Hence, a push-pull operation is obtained in the device.

The RF power output can be expressed in first approximation by $$P_{tot}=n\cdot\tilde{P}_{diode}$$

where

N=the number of tunnel diodes employed, and
$\tilde{P}_{diode}$= the power generated by each tunnel diode (approximately ⅛ $P_{DC}$ per diode).

It is desirable to employ tunnel diodes having similar DC characteristics for maximum power generation. However, this is not mandatory. If the employed tunnel diodes stray in their DC characteristics, equalizing bias resistors can be readily incorporated into the DC strapping arrangements 24 and 26 to achieve optimum performance.

The RF radiation from the tunnel diode gaps, i.e., the gaps in the outer peripheral portions of magnetron resonant structure 10 into which the tunnel diodes 16–23 are inserted, can be largely avoided by surrounding the complete resonator arrangement with an outer shield. Such a shield is shown, in part, in FIGURE 1 and includes an outer annular structure 30 which surrounds the outer periphery of the resonator 10, as well as upper and lower shield surfaces 31 and 32 which overlie the upper and lower surfaces of the resonator. The outer shielding is grounded as at 33, and is preferably divided into sections in order to eliminate spurious modes which could occur as a result of TEM-mode wave propagation. To this effect, additional shielding sections 34 are preferably disposed, in the manner illustrated, between the shield sections 30, 31, 32 and off-resonance points located on the resonator structure 10 intermediate the several cavities 11.

Various arrangements can be employed for coupling power out of the oscillator structure shown in FIGURE 1 to an external load. These coupling arrangements have not been illustrated in FIGURE 1 in order to avoid possible confusion; but some possible such coupling arrangements are shown in FIGURES 3–5.

Figure 3B:
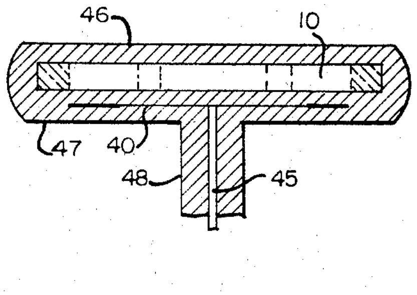

As shown in FIGURES 3A and 3B, coupling to a load can be secured by a loop arrangement. More particularly, a loop array 40 can be disposed adjacent to the magnetron resonance structure 10, in spaced relation to one side of structure 10 (FIG. 3B). The array 40 can comprise a plurality of loops 41–44 (FIG. 3A) associated respectively with alternate ones of the several cavities 11 and coupled to a centrally located conductor 45. The overall structure can moreover be associated with grounded plates 46 and 47 (comprising, for example, portions of the shield structure described previously in reference to FIGURE 1) overlying the upper and lower surfaces of resonant structure 10. Grounded plate 47 merges smoothly into a grounded tubular structure 48 surrounding the central conductor 45 whereby the structure 45, 48, acts as a coaxial connector. The loop array 40 is magnetically coupled to the resonant structure 40 whereby energy circulating in said resonant structure can be transferred to an external load by the arrangement described.

Figure 4:
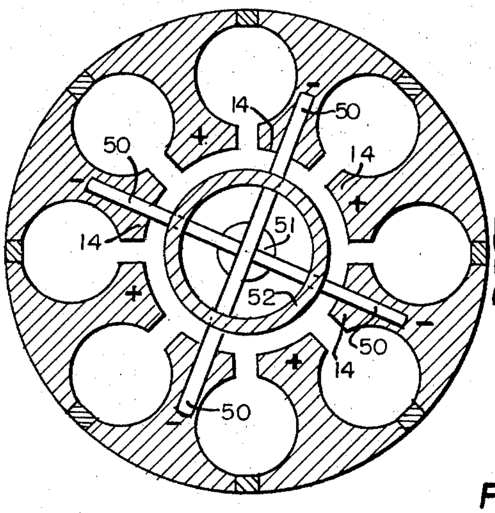
FIGURE 4 is a diagrammatic view of another coupling arrangement which can be employed in the present invention.

In the arrangement of FIGURE 4, output coupling is achieved by a capacitive probe array. More particularly, a plurality of probes 50 are positioned adjacent to alternate ones of poles 14; and these probes 50 are connected to a common central conductor 51. A tubular grounded structure 52 is disposed in spaced surrounding relation to conductor 51 whereby the structure 51, 52, again acts as a coaxial coupling for transferring energy from the resonator system to an external load.

Figure 5A:
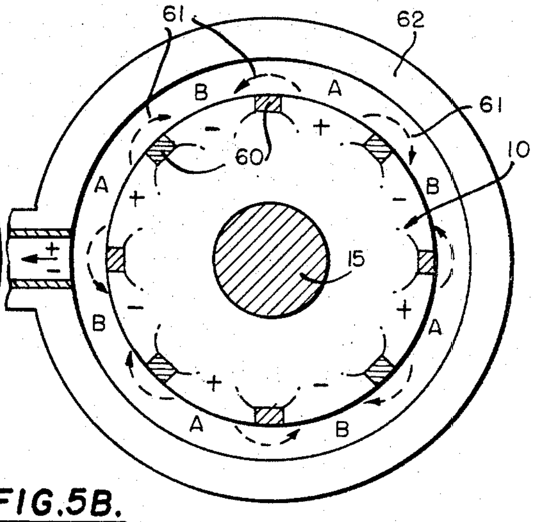
FIGURES 5A and 5B are top and side diagrammatic views respectively of still another coupling arrangement which can be employed in the present invention.
Figure 5B:
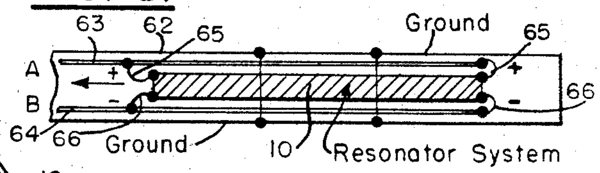

A still further arrangement, making use of the RF leakage field at the tunnel diode gaps, is illustrated in FIGURES 5A and 5B. The several tunnel diode gaps located in the outer periphery of the magnetron resonant structure 10 have been designated 60. These gaps have stray fields designated by the arrows 61 thereacross. An outer grounded shield structure 62 is disposed in surrounding relation to the resonator 10, in a manner similar to that previously described; and the center ground structure 15 of the oscillator is connected to the shield 62. A pair of plates 63 and 64 (FIG. 5B) are positioned within shield structure 62 in overlying spaced relation to the opposing sides of the resonator 10. Plate 63 is connected as at 65 to alternate sections of the resonator 10 designated A in FIGURE 5A; and plate 64 is connected, as at 66, to intervening sections of the resonator 10 designated B in FIGURE 5A. The plates 63 and 64, thus constitute a radial transmission line, i.e., a shielded two-plate (TEM) line, and operate to guide the RF power to an external load.

Figure 6A:
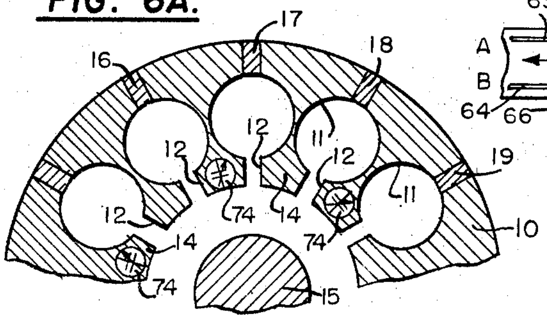
FIGURES 6A and 6B are partial top and side diagrammatic views of the present invention showing a possible tuning arrangement.
Figure 6B:
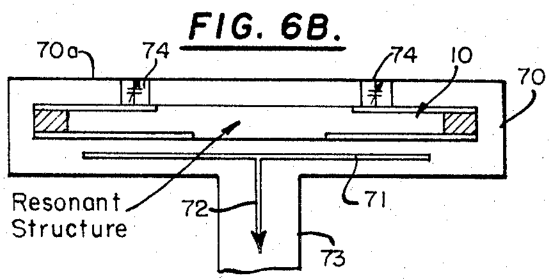

The solid state magnetron of the present invention can be made electronically tunable by means of microwave varactors attached to the structure and properly positioned closely to the RF gap region, as shown in FIGURES 6A and 6B. Thus, the magnetron resonant structure 10 can again be mounted within a shielded enclosure 70, and can include a coupling arrangement comprising an array 71 disposed below and parallel to the resonant structure 10. Array 71 (FIGURE 6B) can comprise either a loop array of the type described previously in reference to FIGURES 3A and 3B, or it can comprise an array of capacitive probes such as has been described in reference to FIGURE 4. Array 71 is coupled to a centrally located conductor 72 associated with a grounded tubular structure 73 to provide a coaxial output. A plurality of varactors 74 can be positioned between alternate ones of the poles 14 and a grounded plate 70*a* comprising a portion of the shield structure 70. The frequency tuning range of the resultant arrangement is determined by the available capacity variation of the varactors employed.

As shown in FIGURE 6A every other RF gap 12 is loaded with a varactor for purposes of symmetric tuning. This tends to avoid moding problems which can occur in magnetrons if one loads the magnetron resonant structure asymmetrically.

Figure 7A:
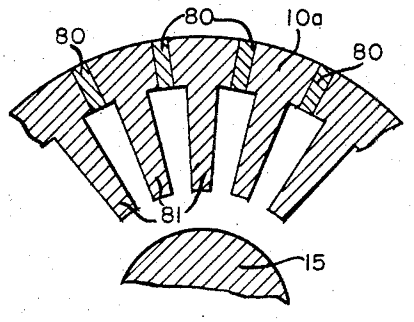
FIGURES 7A and 7B diagrammatically illustrate some other magnetron resonant structures which can be employed in the present invention.

The oscillator of the present invention is not limited to the hole and slot resonant structure described thus far; and the various features of the present invention may in fact be employed in connection with any known magnetron resonant structure. By way of example, FIGURE 7A shows a magnetron resonant structure 10*a* of the vane type; and tunnel diodes 80 may be positioned as shown adjacent to the periphery of structure 10*a* and between the several vanes 81 thereof.

Figure 7B:
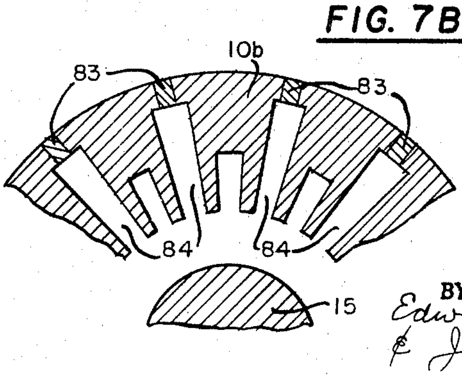

FIGURE 7B shows the arrangement employed in conjunction with a magnetron resonant structure 10*b* of the rising sun type; and tunnel diodes 83 may be positioned as shown between the outer periphery of structure 10*b* and the longer slots 84 of the rising sun structure.

Other variations will be apparent to those skilled in the art; and the foregoing description should therefore be considered illustrative only and not limitative of my invention. All such variations and modifications as are in accord with the principles described are meant to fall within the scope of the appended claims.

Having thus described my invention, I claim:

1. A solid state microwave oscillator comprising a resonant structure of substantially circular configuration defining a plurality of cavities therein disposed in a circular array, and solid state negative impedance means positioned adjacent to said cavities and forming a unitary portion of said resonant structure for adding energy to said resonant structure to sustain oscillations, said resonant structure including a plurality of poles disposed in a circular array and spaced from one another by gaps, said gaps communicating with said cavities respectively and said negative impedance means being positioned substantially in radial alignment with said gaps between said cavities and the outermost periphery of said resonant structure, and a grounded structure disposed adjacent the axis of said pole array and spaced from each of said poles to define an interaction space.

2. The oscillator of claim 1 wherein said negative impedance means comprises tunnel diodes.

3. The oscillator of claim 1 wherein said magnetron resonant structure is of the hole and slot type.

4. The oscillator of claim 1 including a grounded plate overlying said magnetron resonant structure, and means for tuning said oscillator comprising microswave varactors positioned between said plate and circularly spaced portions of said resonant structure.

5. The oscillator of claim 2 including connector means for strapping different ones of said tunnel diodes to one another to form two groups of interconnected tunnel diodes, the diodes in one of said groups being poled in a direction opposite to that of the diodes in the other of said groups, and a direct current voltage source connected to said connector means for providing direct current driving power to said groups of diodes.

6. The oscillator of claim 1 including means for coupling energy from said cavities to an external load.

7. The oscillator of claim 6 wherein said coupling means comprises loop means disposed adjacent alternate ones of said cavities in said array.

8. The oscillator of claim 6 wherein said resonant structure defines poles between said cavities, said coupling means comprising a plurality of probes capacitively coupled to alternate ones of said poles.

References Cited

UNITED STATES PATENTS 3,189,843 6/1965 Bruck .............. 331—107

JOHN KOMINSKI, *Primary Examiner.*